United States Patent
Fink

(10) Patent No.: US 9,266,304 B2
(45) Date of Patent: Feb. 23, 2016

(54) GRID TYPE ELEMENT OF OPEN POLYGONAL CELLS

(71) Applicant: AIRBUS HELICOPTERS DEUTSCHLAND GMBH, Donauworth (DE)

(72) Inventor: Axel Fink, Donauworth (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 31 days.

(21) Appl. No.: 14/101,483

(22) Filed: Dec. 10, 2013

(65) Prior Publication Data
US 2014/0170373 A1 Jun. 19, 2014

(30) Foreign Application Priority Data
Dec. 14, 2012 (EP) ..................................... 12400056

(51) Int. Cl.
| | | |
|---|---|---|
| *B32B 3/12* | (2006.01) | |
| *B29C 70/68* | (2006.01) | |
| *B29D 24/00* | (2006.01) | |
| *B32B 5/24* | (2006.01) | |
| *B32B 7/12* | (2006.01) | |
| *B29C 53/36* | (2006.01) | |

(52) U.S. Cl.
CPC . *B32B 3/12* (2013.01); *B29C 70/68* (2013.01); *B29D 24/005* (2013.01); *B32B 5/245* (2013.01); *B32B 7/12* (2013.01); *B29C 53/36* (2013.01); *B32B 2266/02* (2013.01); *Y10T 29/49904* (2015.01); *Y10T 428/24149* (2015.01)

(58) Field of Classification Search
CPC ............... Y10T 428/24149; Y10T 428/24157; Y10T 428/24165; B32B 3/18; B32B 3/20; B32B 3/22; B32B 3/12; E04D 3/351
See application file for complete search history.

(56) References Cited

U.S. PATENT DOCUMENTS

| | | | |
|---|---|---|---|
| 3,670,555 A | 6/1972 | Fredericks | |
| 4,012,549 A | 3/1977 | Slysh | |
| 4,052,523 A | 10/1977 | Rhodes et al. | |
| 2004/0140049 A1 | 7/2004 | Puriefoy et al. | |
| 2008/0182067 A1* | 7/2008 | Shen ..................... | B29C 44/186 428/117 |
| 2009/0038744 A1 | 2/2009 | Lee et al. | |

FOREIGN PATENT DOCUMENTS

| | | |
|---|---|---|
| DE | 2059628 | 5/1972 |
| DE | 102009053053 | 5/2011 |
| EP | 0948085 | 10/1999 |

OTHER PUBLICATIONS

Extended European Search Report for EP 12400056.3, Completed by the European Patent Office, Dated Jun. 3, 2013, 5 Pages.

* cited by examiner

*Primary Examiner* — Mark Ruthkosky
*Assistant Examiner* — Julia L Rummel
(74) *Attorney, Agent, or Firm* — Brooks Kushman P.C.

(57) ABSTRACT

A grid type element (1) of fiber composite structure, comprising a plurality of open polygonal cells (5) made of at least three core segments (16), said open polygonal cells (5) being stringed together alongside said ribs (16) to form a grid structure, and an essentially planar skin sheet (4), said essentially planar skin sheet (4) being attached unilaterally to the grid structure. A multipartite core (6) is provided, said core segments (6a, 6b, 6c) with respectively rectangular cross sections being formed of said multipartite core (6). Said at least three core segments (6a, 6b, 6c) are pivotable interconnected with at least two reduced cross sections (9) between two of said at least three core segments (6a, 6b, 6c) and at least one fiber composite layer (8, 7) is provided with said multipartite core (6), said at least one fiber composite layer (8, 7) sheathing at least partly said multipartite core (6). The invention is as well related to a method of manufacturing such grid type elements.

11 Claims, 5 Drawing Sheets

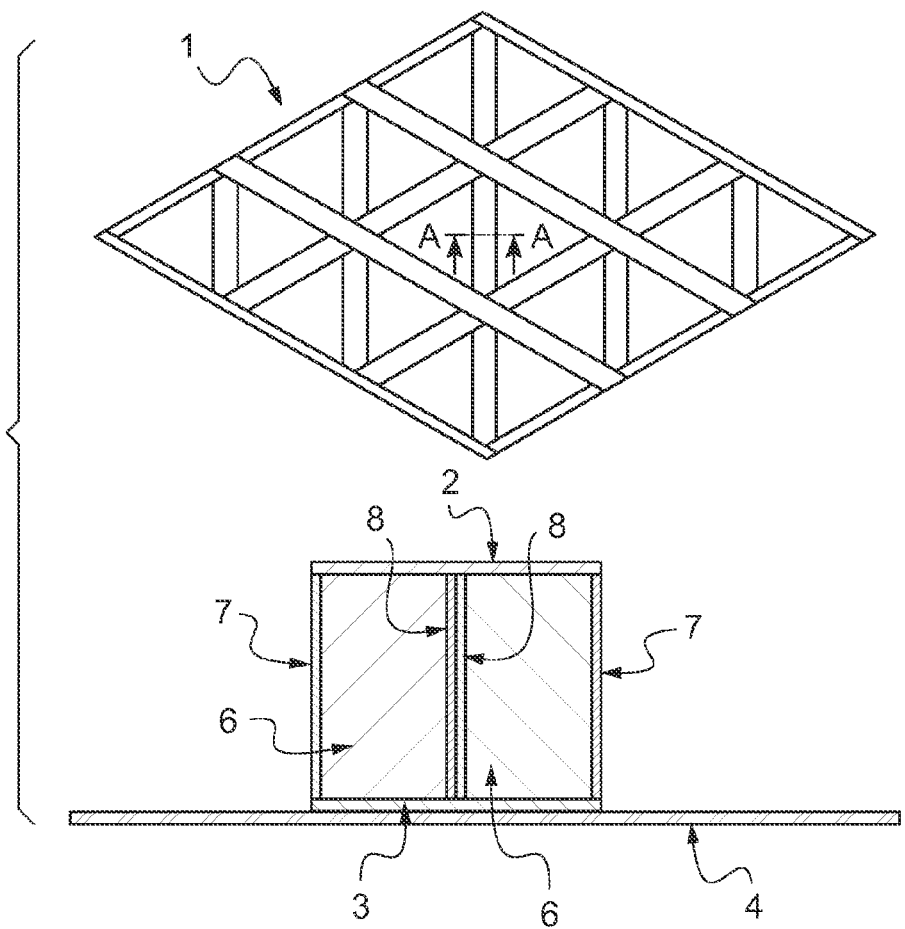
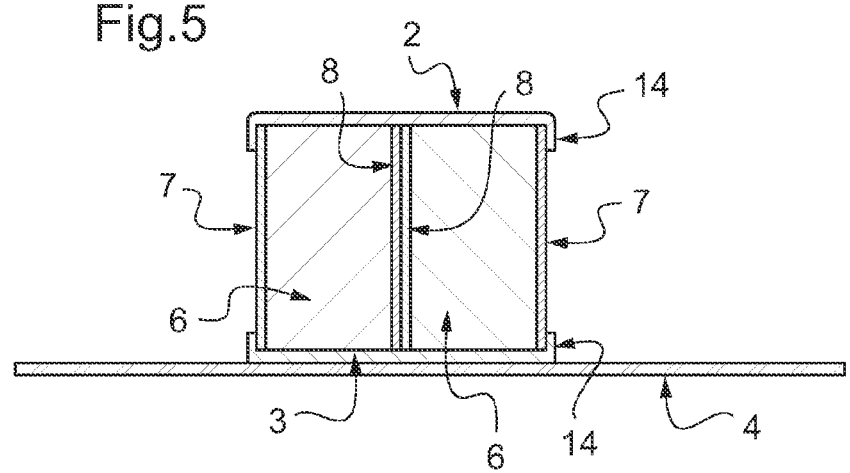

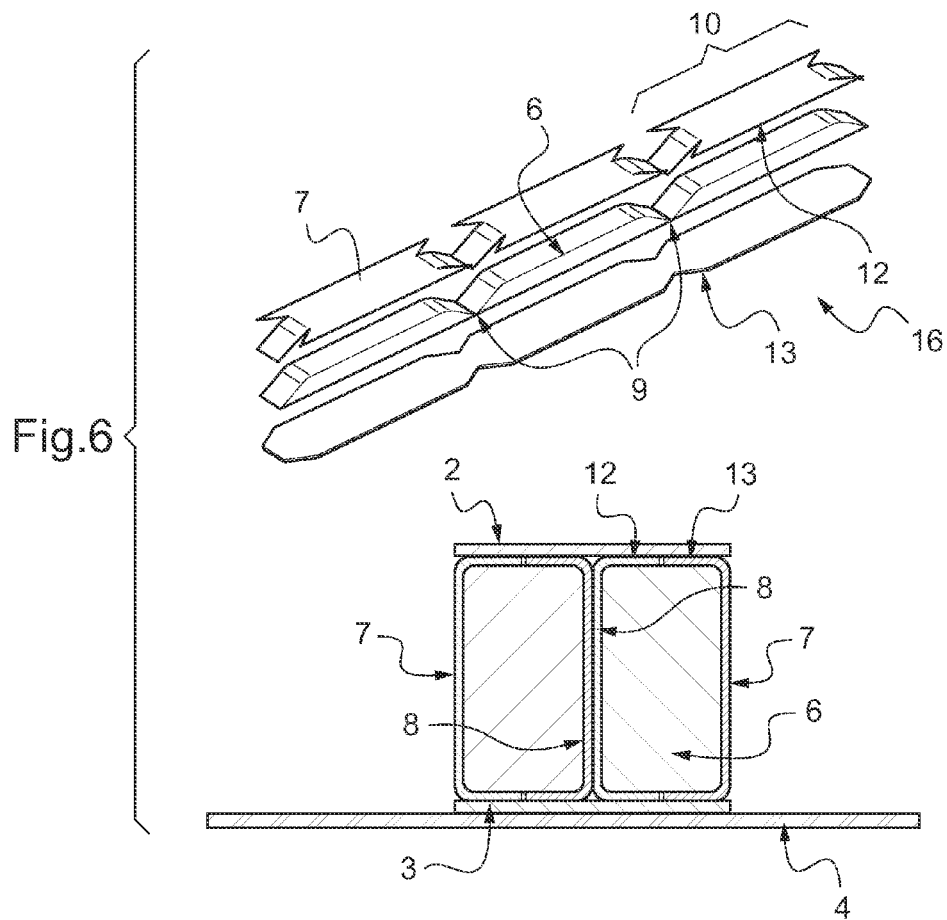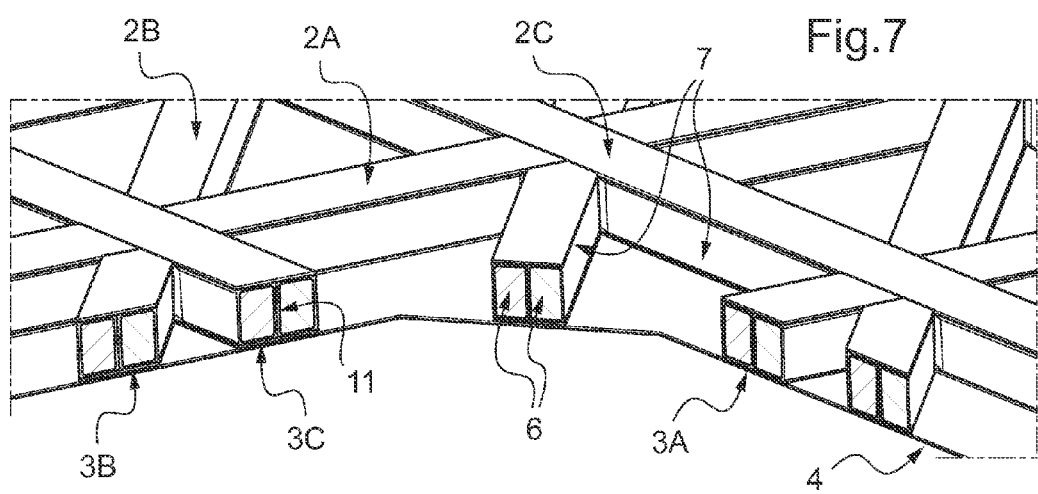

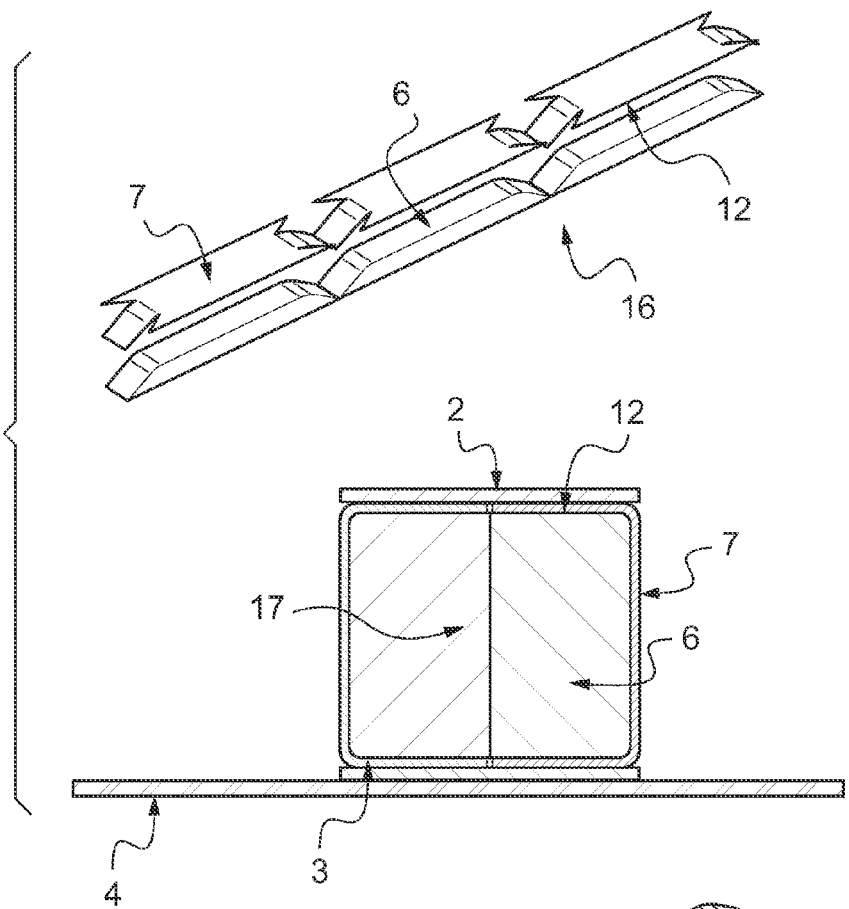
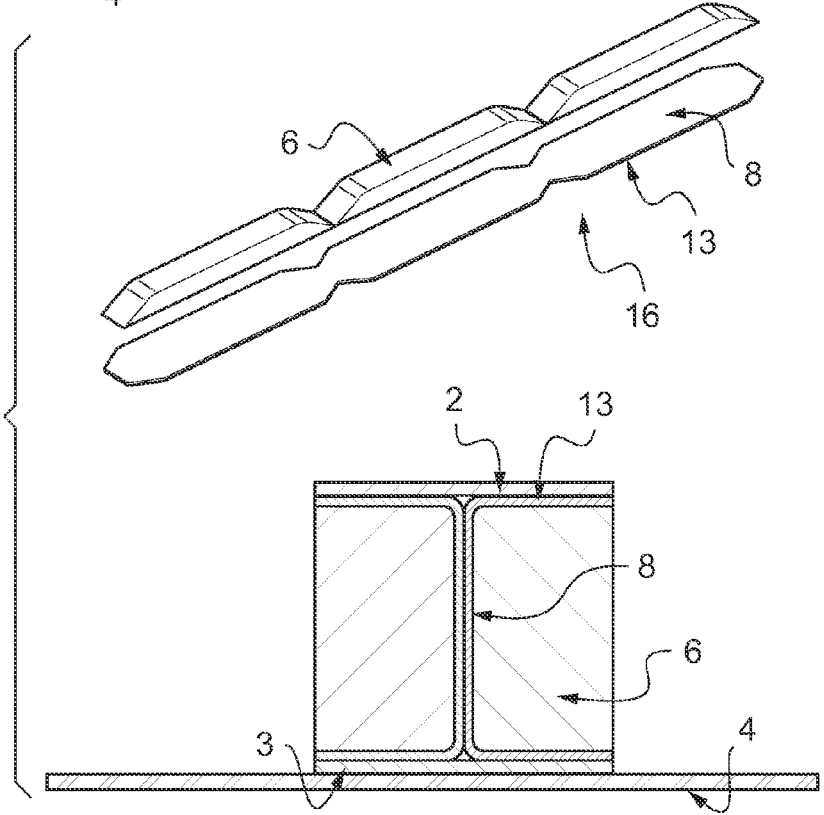

GRID TYPE ELEMENT OF OPEN POLYGONAL CELLS

CROSS REFERENCE TO RELATED APPLICATION

This application claims priority to European patent application No. 12 400056.3 filed Dec. 14, 2012, the disclosure of which is incorporated in its entirety by reference herein.

BACKGROUND OF THE INVENTION (1) Field of the Invention

The invention is related to a grid type fiber composite structure, particularly to a transverse force resilient grid type fiber composite structure for local load application with the features of claim 1, and a method of manufacturing such grid type fiber composite structures with the features of claim 11.

(2) Description of Related Art

The document US2004140049 A1 discloses a method of manufacturing a hollow section grid-stiffened panel comprising a tool having a surface. The stiffened skin composite panel is preassembled comprising laminating a composite outer skin on the surface, placing a separator outer layer on the composite outer skin, and laminating a composite stiffener on the mandrel, the mandrel being positioned on the separator layer, wherein the separator layer separates the stiffener and the mandrel from the outer composite skin.

The preassembled outer skin composite panel is cured on the tool. The separator layer and mandrel are removed from the preassembled stiffened skin composite panel. The stiffened skin composite panel is reassembled, comprising applying an adhesive between the composite outer skin and the composite stiffener. The reassembled stiffener skin composite panel is cured on the tool to bond the stiffener skin to the outer skin.

The document US2009038744 A1 discloses a cellular composite structure with a grid having groups of angularly intersecting ribs. The ribs of each group are oriented substantially in the same direction to each other and angularly oriented from the other rib groups. An additional rib defines a composite structure outer perimeter wall and can be differently angularly oriented from the other ribs. A contiguous rib wall is created by segments of ribs defined by rib intersections. The contiguous rib wall bounds a cavity. A multilayer sheet cap member with extending walls to engage the contiguous rib wall is positioned within the cavity. The engagement walls extend from individual sheet perimeter portions angularly oriented to the sheet. The ribs and cap member have pre-impregnated resin. Heating the cap member and ribs activates the resin and co-cures the composite structure.

The document EP 0 948 085 A2 relates to high stiffness parabolic structures utilizing integral reinforced grids and more particularly to a high stiffness parabolic structure utilizing an integral reinforcing grid which includes a skin facesheet having a generally parabolic shape; and a grid attached to the skin facesheet and having a triangular isogrid pattern.

The document DE 10 2009 053 053 A1 discloses a component with a rib structure provided with ribs that run along polygon edges, and including laminar grid-like polygons that are arranged next to each other. Two plate-shaped fiber composite structures containing carbon fibers represent the rib structure, where one of the fiber composite structures is fastened at a flat side of the other fiber composite structure and formed based on a flat fiber composite structure by inserting sections into an interior of a polygon and transforming produced structure projections to form the rib structure.

The document U.S. Pat. No. 4,052,523 A discloses a lattice type structural panel utilizing the unidirectional character of filamentary epoxy impregnated composites to produce stiff lightweight structural panels for use in constructing large area panels for space satellites and the like.

The document U.S. Pat. No. 4,012,549 A discloses a grid structure of I-beam members arranged in an integral repeating pattern of substantially equilateral triangles integral with a skin sheet covering the structure. The beam webs are filled with advanced composite materials comprising high-strength fibers in a supporting matrix. Preferably, the fibers run parallel to the beam webs for a structure of improved stiffness with a high strength-to-weight ratio.

BRIEF SUMMARY OF THE INVENTION

It is an object of the invention to provide a grid type fiber composite structure, particularly a transverse force resilient grid type fiber composite structure for local load application, with a high strength-to-weight ratio that alleviates specific short comings of conventional grid structures. It is a further object of the invention to provide a method for automated manufacturing of such grid type fiber composite structures.

The solution is provided with a grid type fiber composite structure, particularly with a transverse force resilient grid type element of fiber composite structure for local load application with the features of claim 1 and with a method of manufacturing such grid type fiber composite structures with the features of claim 11.

According to the invention a grid type fiber composite structure comprises a plurality of open polygonal cells each with at least three core segments, said open polygonal cells being stringed together alongside said core segments to form a grid structure. Preferably said open polygonal cells are triangular cells made of three core segments and said multipartite core is a tripartite core. An essentially planar skin sheet is attached unilaterally to the grid structure for a stiffened grid type element of fiber composite structure. Said core segments are formed of a multipartite core with respectively rectangular cross sections. Said at least three core segments are pivotable interconnected with at least two reduced cross sections between two of said at least three core segments.

At least one fiber composite layer is provided with said multipartite core, said at least one fiber composite layer sheathing at least partly said multipartite core. The inventive grid type fiber composite structure is particularly suitable for shells loaded via selected points by transverse forces, such shells being used as floor panels of aircrafts. The inventive grid type fiber composite structure allows a modular assembly from open polygonal cells, preferably open triangular cells as single grid cells.

The respectively rectangular cross sections of the multipartite cores of the open polygonal cells are suitable for manufacturing in high numbers by automated procedures. The multipartite cores of the open polygonal cells are sheathed at least partly by at least one fiber composite layer for stabilisation and for protection against any environmental impact. Said open polygon cells being stringed together alongside each other result in a stabilised rib-structure for light weight, shear stiff and shear resistant fillets and flanges against buckling with open triangular cells resulting in particularly shear stiff fillets allowing an optimized application of transversal forces at stiffened intersection points of the inventive grid type fiber composite structure.

The fiber composite layers of the triangular cells focusing at an intersection point are all directly or indirectly linked to each other for efficient transfer of any transversal forces into the inventive grid type fiber composite structure. The respective multipartite cores of the open polygonal cells allow a particularly weight optimized structure of the inventive grid type fiber composite structure. The sheathing of the multipartite cores of the open polygonal cells allows for each rectangular cross section of the multipartite cores having the same orientation of the fibers of each fiber composite layer, which is advantageous for a uniform structural behaviour of the inventive grid type fiber composite structure.

According to a preferred embodiment of the invention said grid structure is covered respectively by an upper layer of strips and/or an opposed layer of congruent strips.

According to a further preferred embodiment of the invention said triangular cells are preassembled from the tripartite core and the at least one fiber composite layer.

According to a further preferred embodiment of the invention said at least one fiber composite layer is cut and textured.

According to a further preferred embodiment of the invention said fiber composite layer is a pre-impregnated semi-finished part.

According to a further preferred embodiment of the invention the multipartite core is made of foam for a light weight structure.

According to a further preferred embodiment of the invention the fiber composite layers and/or the foam cores comprise adhesive sections for shear stiff coupling of adjacent peripheral rips.

According to a further preferred embodiment of the invention the fiber composite layer comprises lateral flaps for covering of upper and/or lower surfaces of the peripheral rips for better protection of their foam cores.

According to a further preferred embodiment of the invention the continuous rectangular cross sections of the core segments of the multipartite core are tapered with sloped surfaces at the respective ends of the core segments toward said pivotable, interconnecting, reduced cross sections between two of said at least three core segments.

According to a preferred embodiment of the invention a method of manufacturing a grid type element of fiber composite structure comprises the following steps: first providing cut and textured fiber composite layers and at least two identical, essentially longitudinal multipartite cores of core segments, preferably identical, essentially longitudinal tripartite cores with three core segments, and then sheathing each longitudinal multipartite core at least partly with at least one of said textured fiber composite layers to an essentially longitudinal semi finished part.

Secondly folding each essentially longitudinal semi finished part to form a transversal open polygon cell with cell segments joined to a closed layout, preferably a triangular cell with three cell segments. Thirdly stringing together the identical open polygonal cells alongside the core segments to form an essentially planar grid and mounting said grid onto an essentially planar skin sheet.

An advantage of the inventive method is the simple processing of the flat and longitudinal multipartite cores from flat shells helping to reduce waste. The assembly of the advantageous multipartite cores to polygons favours automation in high numbers and the inventive grid type element may be assembled modularly by stringing together the single polygons on the essentially planar skin sheet. Draping of the cut and textured fiber composite layers to the grid of multipartite cores is effected comfortable in one plane and may be easily automated.

According to a further preferred embodiment of the inventive method an upper layer with intersecting strips and/or an opposed layer with intersecting strips are provided to cover said cell segments respectively for providing the composite structure with the required bending and torsional stiffness.

BRIEF DESCRIPTION OF THE SEVERAL VIEWS OF THE DRAWINGS

Preferred embodiments of the invention are outlined by way of example with the following description with reference to the attached drawings.

FIG. 4 shows a cross sectional view of a section of the grid type element according to the invention, FIG. 5 shows a cross sectional view of a section of an alternative grid type element according to the invention, FIG. 6 shows an exploded and a cross sectional view of a section of a further alternative grid type element according to the invention, FIG. 7 shows a cross sectional view through an alternative section of the grid type element according to FIG. 6, FIG. 8 shows an exploded and a cross sectional view of a section of a still further alternative of the grid type element according to the invention, and FIG. 9 shows an exploded and a cross sectional view of a section of another alternative of the grid type element according to the invention.

Figure 1:
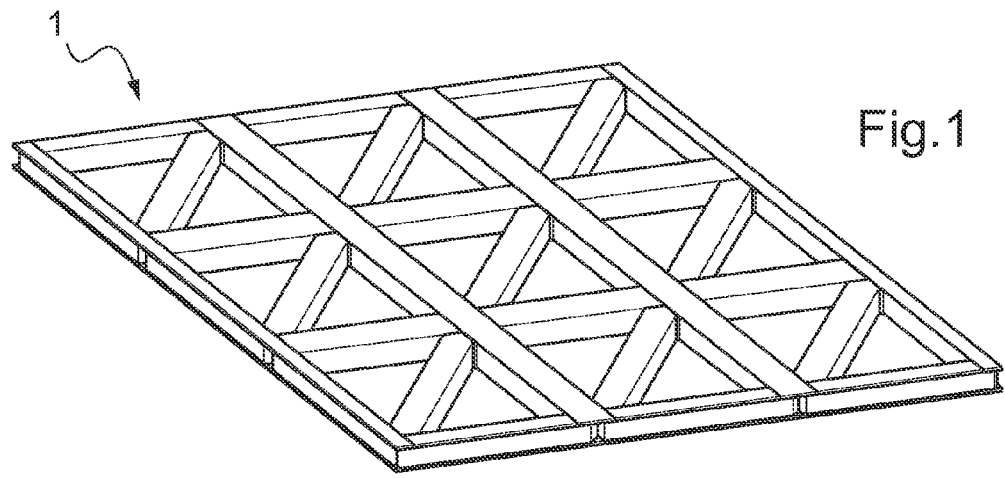
FIG. 1 shows a top overall view of a grid type element according to the invention.

According to FIG. 1, 2 a grid type fiber composite structure 1 comprises an upper layer 2 of intersecting strips 2a, 2b, 2c, a plurality of respectively open triangular cells 5 as identical polygonal cells, an opposed layer 3 of congruent intersecting strips 3a, 3b, 3c and a lower planar skin sheet 4. Layer 3 is opposed to and congruent with upper layer 2 with regard to the open triangular cells 5. The planar skin sheet 4 is made of fiber composite material or of metal.

DETAILED DESCRIPTION OF THE INVENTION

The grid type fiber composite structure 1 is substantially planar. The triangular cells 5 are open in a direction perpendicular to said plane defined by the grid type fiber composite structure 1. Each of the triangular cells 5 comprises three cell segments 10 joint to a closed layout within said plane defined by the grid type fiber composite structure 1. Two of the three cell segments 10 have equal length for equal-sided triangular cells 5. Three of three cell segments 10 have equal length for equilateral triangular cells 5. Two of four cell segments 10 have pairwise equal length for rectangular cells 5. Four of four cell segments 10 have equal length for square cells 5.

The plurality of open triangular cells 5 is stringed together along outer planar surfaces transverse to said closed layout to form a quadratic grid. Each of the intersecting strips 2a, 2b, 2c of the upper layer 2 and each of the congruent intersecting strips 3a, 3b, 3c of the lower layer 3 are provided with a triangular pattern, such that each of the intersecting strips 2a, 2b, 2c of the upper layer 2 and each of the congruent intersecting strips 3a, 3b, 3c of the lower layer 3 are respectively aligned in one of the three directions defined by respective inherent longitudinal axis along each of said essentially longitudinal cell segments 10 of the open triangular cells 5.

The upper layer 2 is attached unilaterally to a top of the grid, the opposed layer 3 is attached unilaterally to a bottom of the grid. The lower planar skin sheet 4 is attached unilaterally from below to the opposed layer 3. The lower planar skin sheet 4 covers unilaterally the entire grid resulting in the essentially planar grid type fiber composite structure 1.

An increased material thickness due to intersecting strips 2a, 2b, 2c of the upper layer 2 and the congruent intersecting strips 3a, 3b, 3c of the opposed layer 3 is compensated through appropriate shaping of the three cell segments 10 at any intersection points 18 in a direction perpendicular to said plane defined by the grid type fiber composite structure 1, to provide first of all a planar lower surface for a grid type fiber composite structure 1 with the opposed layer 3.

Figure 3:
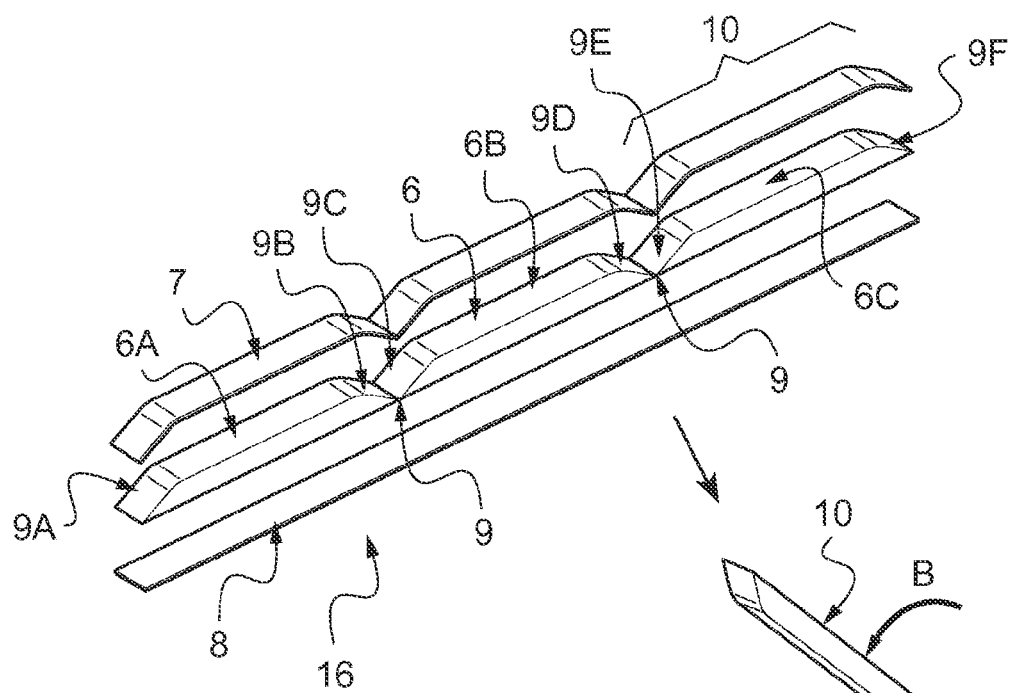
FIG. 3 shows overall views of steps of assembly of a triangular cell of the grid type element according to the invention.
Figure 3:
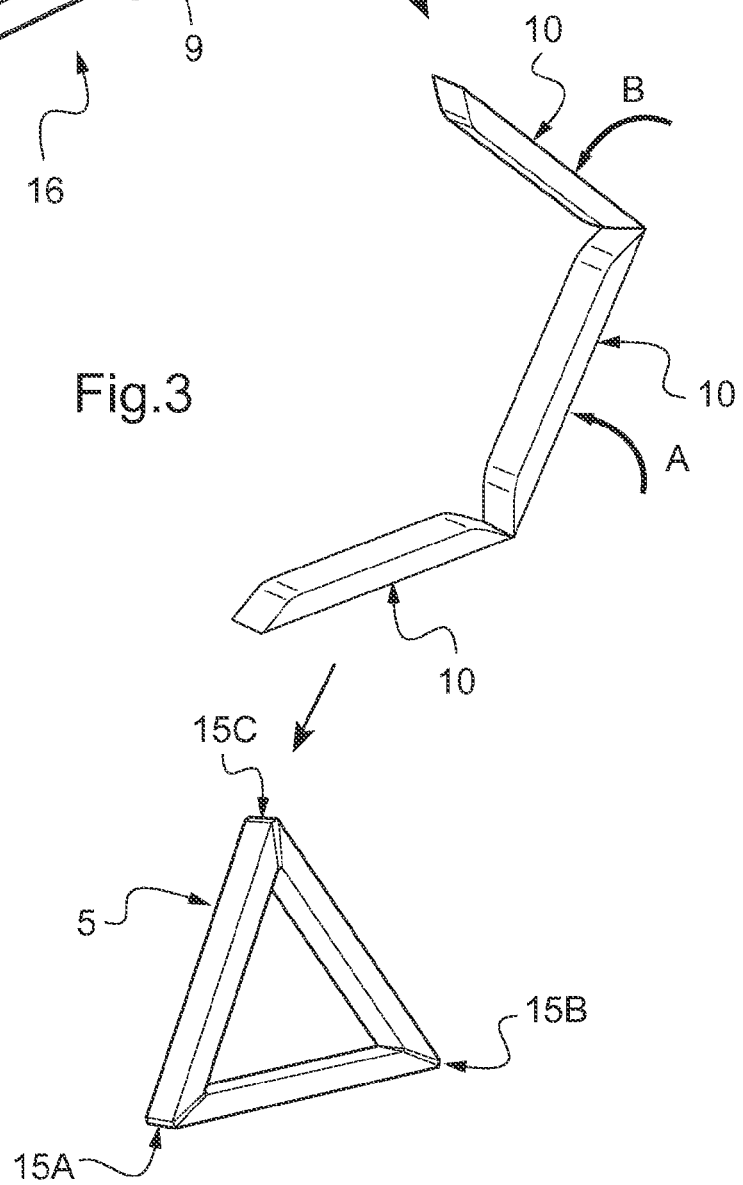

According to FIG. 3 corresponding features are referred to with the references of FIG. 1, 2. One open triangular cell 5 comprises as multipartite core a tripartite core 6 of three core segments 6a, 6b, 6c. Each of said three core segments 6a, 6b, 6c extends principally along a respective inherent longitudinal axis (not shown) and each of said three core segments 6a, 6b, 6c has an inner surface transverse to said layout along said longitudinal axis and an outer planar surface equally transverse to said layout along said longitudinal axis. Said three core segments 6a, 6b, 6c have equal length. The tripartite core 6 is made of foam.

A fiber composite layer 7 is provided for sheathing entirely said inner transverse surfaces of each of said core segments 6a, 6b, 6c with rectangular cross sections and a further fiber composite layer 8 is provided for sheathing entirely said outer planar transverse surface of said core segments 6a, 6b, 6c.

Said three core segments 6a, 6b, 6c of one tripartite core 6 are provided with pivotable interconnections by means of reduced cross sections 9 between respectively two of said three core segments 6a, 6b, 6c. The reduced cross sections 9 are provided by means of unilaterally tapering ends of each of said three core segments 6a, 6b, 6c respectively to sloped surfaces 9A-9F at the inside of the tripartite core 6. Both ends of each of the core segments 6a, 6b, 6c are provided with complementary reduced cross sections, covering each other entirely for interconnection of said core segments 6a, 6b, 6c to a closed layout for each of said cell segments 10 with corners 15 fitting offset free.

The fiber composite layer 7 is cut and textured to fit to the inside of the tripartite core 6 with the three core segments 6a, 6b, 6c and said two reduced cross sections 9 with sloped surfaces 9A-9F. The further fiber composite layer 8 is cut and textured to a rectangular layout to fittingly cover the planar outside of the tripartite core 6. The fiber composite layers 7, 8 are pre-impregnated tissue layers with a fiber orientation of 45° relative to the longitudinal direction of the tripartite core 6.

The cut and textured fiber composite layer 7 is laminated to the inside of the tripartite core 6 with said two reduced cross sections 9 with sloped surfaces 9A-9F and the cut and textured further fiber composite layer 8 is laminated to the planar outside of the tripartite foam 6 for provision of a longitudinal semi finished part 16.

The longitudinal semi finished part 16 with the respectively laminated outside fiber composite layer 8 and inside fiber composite layer 7 on the three core segments 6a, 6b, 6c remains uncovered along the upper and lower surfaces.

Two sections A and B of the longitudinal semi finished part 16 are pivoted respectively around said two reduced cross sections 9 and relative to a fix cell segment 10 to the open triangular cell 5 with fitting transitions 9A, 9B, 9C, 9D, 9E, 9F for continuous rectangular cross sections at closed corners 15A, 15B, 15C. The respective fiber orientations of the fiber composite layers 7, 8 remain the same after folding for all of the cell segments 10.

The foam core 6 is made of polystyrene (PS), polymethacrylimid (PMI), polyvinyl chloride (PVC), polyurethane (PU), polypropylene (PP), polyethylene (PE), carbon or of honeycomb material or balsa.

Figure 2:
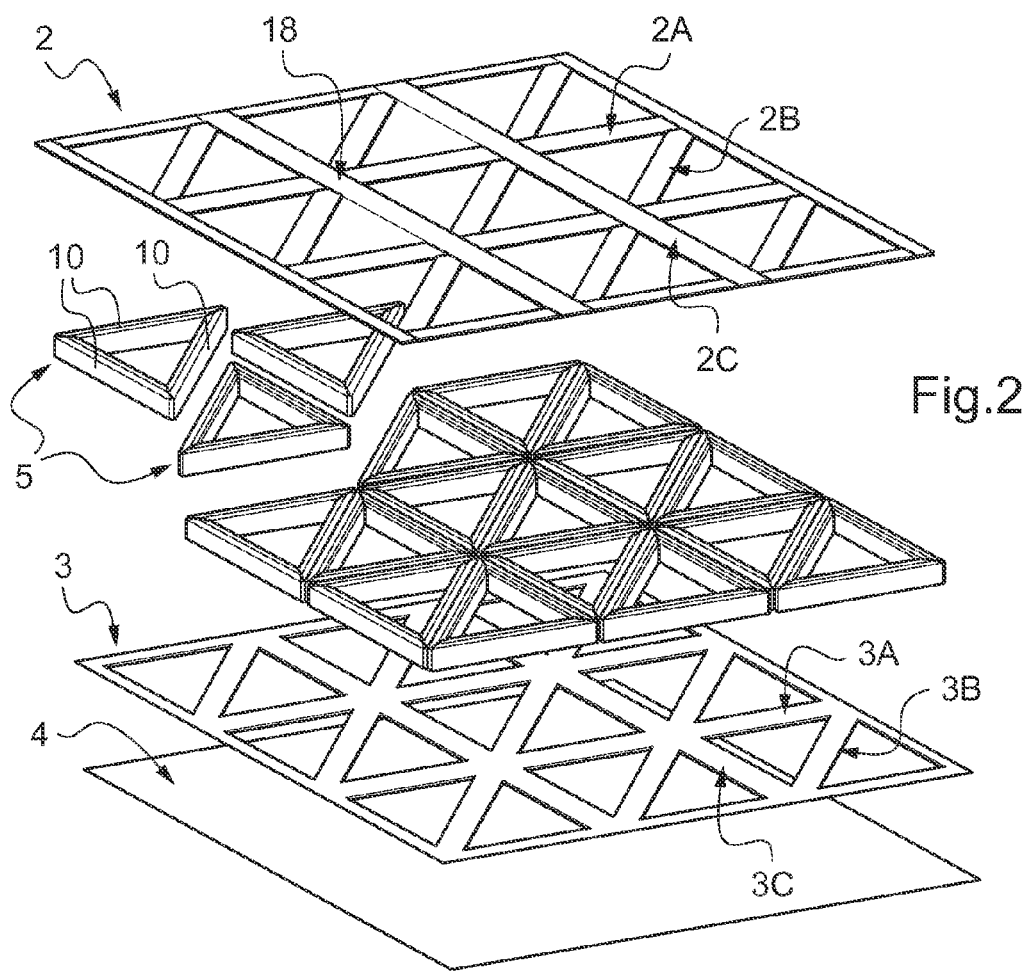
FIG. 2 shows an exploded view of the grid type element according to the invention.

According to FIG. 4 corresponding features are referred to with the references of FIGS. 1-3. Adjacent triangular cells 5 are mounted on the planar skin sheet 4 for provision of the essentially planar grid type fiber composite structure 1. The opposed layer 3 is arranged between the tripartite core 6 and the planar skin sheet 4 and the upper layer 2 on top of and across the tripartite cores 6.

Between the tripartite cores 6 are the respective outside fiber composite layers 8 attached along said outer planar surface of the core segments 6a, 6b, 6c, while the respective inside fiber composite layers 7 cover the inner surface transverse to said layout of the tripartite cores 6. Strips 2a, 2b, 2c of the upper layer 2 and congruent intersecting strips 3a, 3b, 3c of the opposed layer 3 have respectively a width corresponding to the respective widths of two juxtaposed upper or lower surfaces of any of the core segments 6a, 6b, 6c of the tripartite cores 6 plus the widths of two times the respective width of an outside fiber composite layer 8 plus the widths of two times the respective width of an inside fiber composite layer 7 with the exception of the strips 2a, 2b, 2c of the upper layer 2 and congruent intersecting strips 3a, 3b, 3c of the opposed layer 3 bordering the essentially planar grid type fiber composite structure 1, said bordering strips 2a, 2b, 2c of the upper layer 2 and bordering congruent intersecting strips 3a, 3b, 3c having respectively a width corresponding to the respective widths of one upper or lower surface of any of the core segments 6a, 6b, 6c of the tripartite cores 6 plus the width of an outside fiber composite layer 8 plus the width of an inside fiber composite layer 7.

The outside fiber composite layers 8 and the inside fiber composite layers 7 provide fillets stabilised by the adjacent tripartite cores 6. The respective outside fiber composite layers 8 of adjacent cell segments 10 adhere to each other. The cell segments 10 stabilise the upper layer 2 and the opposed layer 3 acting as flanges.

According to FIG. 5 corresponding features are referred to with the references of FIGS. 1-4. Bilaterally extended end sections 14 of the upper layer 2 and the opposed layer 3 respectively encompass parts of the respective inside fiber composite layers 7 for complete sealing of the tripartite cores 6.

According to FIG. 6 corresponding features are referred to with the references of FIGS. 1-5. The outside fiber composite layer 8 and the inside fiber composite layer 7 are each respectively provided with lateral flaps 12, 13 for folding around the edges of the tripartite core 6 to cover not only the inner transverse surface and the outer transverse planar surface of the tripartite core 6 but also respectively partly the upper and lower surfaces for provision of the longitudinal semi finished part 16 for provision of entirely covered upper and lower surfaces of the tripartite core 6.

The lateral flaps 12, 13 cover together all of the upper and lower surfaces of the longitudinal semi finished part 16 thus allowing linkage of the respective outside fiber composite layers 8 and the respective inside fiber composite layers 7 of tripartite cores 6 to the upper layer 2 and the opposed layer 3 via the lateral flaps 12, 13 for a shear stiff connection of the respective outside fiber composite layers 8 and the respective inside fiber composite layers 7 with the upper layer 2 and the opposed layer 3 and the tripartite cores 6.

According to FIG. 7 corresponding features are referred to with the references of FIGS. 1-6. The intersecting strips 2a, 2b, 2c of the upper layer 2 with a triangular pattern are respectively attached to the lateral flaps 12, 13 of the respective outside fiber composite layers 8 and the respective inside fiber composite layers 7 covering respectively not only the inner transverse surface and the outer transverse planar surface of the tripartite core 6 but also the upper surfaces of two-adjacent tripartite cores 6. The congruent intersecting strips 3a, 3b, 3c of the opposed layer 3 with a triangular pattern are correspondingly attached to the lateral flaps 12, 13 of the respective outside fiber composite layers 8 and the respective inside fiber composite layers 7 across the lower surface of two-adjacent tripartite cores 6. The respective outside fiber composite layers 8 between two-adjacent tripartite cores 6 are connected to provide a common shear stiff fillet 11.

The lower planar skin sheet 4 is attached to the congruent intersecting strips 3a, 3b, 3c of the opposed layer 3 for provision of the essentially planar grid type fiber composite structure 1.

According to FIG. 8 corresponding features are referred to with the references of FIGS. 1-7. The inside fiber composite layer 7 is provided with lateral flaps 12 for folding around the edges of the tripartite foam core 6 to cover not only the inner transverse surface of the tripartite core 6 but also entirely the upper and lower surfaces for provision of the longitudinal semi finished part 16, thus allowing linkage of the respective inside fiber composite layers 7 along the tripartite cores 6 to the upper layer 2 and the opposed layer 3 via the lateral flaps 12 for a shear stiff connection of the respective inside fiber composite layers 7 with the upper layer 2 and the opposed layer 3 across the tripartite cores 6. The tripartite cores 6 in contact with each other along their respective adhesive layers 17 are provided with glue for an adhesive interface.

The lower planar skin sheet 4 is attached to the opposed layer 3 of the essentially planar grid type fiber composite structure 1.

According to FIG. 9 corresponding features are referred to with the references of FIGS. 1-8. The outside fiber composite layer 8 is provided with lateral flaps 13 for folding around the edges of the tripartite core 6 to cover not only the outer transverse surface of the tripartite core 6 but also entirely the upper and lower surfaces for provision of the longitudinal semi finished part 16, thus allowing linkage of the respective outside fiber composite layers 8 of tripartite cores 6 to the upper layer 2 and the opposed layer 3 via the lateral flaps 13 for a shear stiff connection of the respective outside fiber composite layers 8 with the upper layer 2 and the opposed layer 3 across the tripartite cores 6.

The lower planar skin sheet 4 is attached to the opposed layer 3 of the essentially planar grid type fiber composite structure 1.

REFERENCE LIST 1 grid type fiber composite structure
2 upper layer
2a, 2b, 2c intersecting strips of upper layer
3 opposed layer
3a, 3b, 3c intersecting strips of lower layer
4 planar skin sheet
5 polygon cells
6 multipartite core
6a, 6b, 6c core segments
7 inside fiber composite layer
8 outside fiber composite layer
9 reduced cross section
9A-9F sloped surfaces
10 cell segment
11 fillet
12 flaps of the inside fiber composite layer
13 flaps of the outside fiber composite layer
14 end sections
15 corner
16 longitudinal semi finished part
17 adhesive layer
18 intersection point

What is claimed is:

1. A grid type fiber composite structure comprising:
a plurality of open polygon cells arranged in a planar layout and each comprising at least three cell segments, the at least three cell segments comprising:
a multipartite core being made of foam and comprising at least three core segments, each of the core segments having a substantially rectangular cross section, an inner planar surface corresponding to a first side of the rectangular cross section, and an outer planar surface corresponding to a second side of the rectangular cross section that is opposite the first side,
wherein each of the core segments extends principally along a respective inherent longitudinal axis, and
wherein the inner and outer planar surfaces of a core segment are positioned transverse to the inherent longitudinal axis and perpendicular to the planar layout;
a fiber composite layer sheathing entirely the inner planar surface of each of the multipartite cores; and
a fiber composite layer sheathing entirely the outer planar surface of each of the multipartite cores,
wherein each of the at least three cell segments is pivotably interconnected with at least another one of the at least three cell segments to form one of the open polygon cells, the cell segments being oriented in at least two different directions, and the open polygon cells are joined together along respective outer planar surfaces to form a grid;
an essentially planar skin sheet attached to one side of the grid; and
a layer of intersecting strips positioned on the opposite side of the grid from the planar skin sheet, wherein strips in the layer of intersecting strips cover the cell segments of the open polygon cells along each of the at least two different directions.

2. The structure according to claim 1, further comprising a layer of intersecting strips positioned between the planar skin sheet and the covering the polygon cells; wherein strips in the layer of intersecting strips cover the cell segments of the open polygon cells along each of the at least two different directions.

3. The structure according to claim 1, wherein both ends of each of the core segments are provided with complementary reduced cross sections defining respectively two sloped surfaces, all of the two sloped surfaces of two adjacent core segments covering each other entirely for interconnection of the core segments to a closed layout for each of the cell segments.

4. The structure according to claim 3, wherein the rectangular cross sections of the multipartite core are tapered toward interconnecting reduced cross sections between two of the at least three core segments.

5. The structure according to claim 1, wherein the fiber composite layers are cut and textured.

6. The structure according to claim 1, wherein the fiber composite layers are each a dry semi-finished part or a pre-impregnated semi-finished part.

7. The structure according to claim 1, wherein the fiber composite layers and/or the multipartite core comprises adhesive interfaces of fillet and/or adhesive layer.

8. The structure according to claim 1, wherein at least one of the fiber composite layers comprises lateral flaps.

9. A method of manufacturing the grid type fiber composite structure according to claim 1, comprising the steps of:

providing fiber composite layers and foam multipartite cores with at least three essentially longitudinal core segments, wherein the core segments have a substantially rectangular cross section, an inner planar surface corresponding to a first side of the rectangular cross section, and an outer planar surface corresponding to a second side of the rectangular cross section that is opposite the first side, and wherein the core segments are pivotably connected to each other by means of reduced cross sections between the core segments;

sheathing the inner and outer planar surfaces of each of the core segments of the multipartite cores with fiber composite layers;

pivoting the essentially longitudinal core segments of each of the multipartite cores with the respective fiber composite layers to form open polygon cells with cell segments;

joining together the open polygonal cells alongside their cell segments to form a grid;

providing a layer of intersecting strips;

covering the cell segments with the layer of intersecting strips such that strips in the layer of intersecting strips cover the cell segments of the open polygon cells along each of the at least two different directions;

and mounting the grid onto an essentially planar skin sheet.

10. The method according to claim 9, wherein the step of sheathing the inner surfaces of the tripartite cores with the fiber composite layer includes at least partly also sheathing the upper and/or lower surfaces of the tripartite cores.

11. The method according to claim 10, wherein the step of sheathing the outer surface of the tripartite cores with the fiber composite layer includes at least partly also sheathing the upper and/or lower surfaces of the tripartite cores.

* * * * *